US012682439B2

(12) United States Patent
Zheng et al.

(10) Patent No.: US 12,682,439 B2
(45) Date of Patent: Jul. 14, 2026

(54) WINDOW INSPECTING METHOD AND DEVICE FOR BEARING HOLDER

(71) Applicant: SHANDONG GOLDEN EMPIRE PRECISION MACHINERY TECHNOLOGY CO., LTD, Liaocheng (CN)

(72) Inventors: Guanghui Zheng, Liaocheng (CN); Peizhen Zhao, Liaocheng (CN)

(73) Assignee: SHANDONG GOLDEN EMPIRE PRECISION MACHINERY TECHNOLOGY CO., LTD, Liaocheng (CN)

( * ) Notice: Subject to any disclaimer, the term of this patent is extended or adjusted under 35 U.S.C. 154(b) by 304 days.

(21) Appl. No.: 18/541,000

(22) Filed: Dec. 15, 2023

(65) Prior Publication Data

US 2024/0346636 A1     Oct. 17, 2024

Related U.S. Application Data

(63) Continuation of application No. PCT/CN2023/106117, filed on Jul. 6, 2023.

(30) Foreign Application Priority Data

Apr. 12, 2023     (CN) .......................... 202310382002.0

(51) Int. Cl.
 *G06T 7/00* (2017.01)
 *G06T 7/12* (2017.01)
 (Continued)

(52) U.S. Cl.
 CPC .............. *G06T 7/0002* (2013.01); *G06T 7/12* (2017.01); *G06T 7/174* (2017.01); *G06T 7/60* (2013.01);
 (Continued)

(58) Field of Classification Search
 None
 See application file for complete search history.

(56) References Cited

U.S. PATENT DOCUMENTS

| | | | |
|---|---|---|---|
| 9,989,477 B2 * | 6/2018 | Vaez-Iravani .... | G01N 21/95623 |
| 11,087,458 B2 * | 8/2021 | Link ......................... | G06T 7/75 |

(Continued)

FOREIGN PATENT DOCUMENTS

| | | |
|---|---|---|
| CN | 102451838 A | 5/2012 |
| CN | 105738136 A | 7/2016 |

(Continued)

OTHER PUBLICATIONS

Hu Xiao-Hong, Based on Image Processing Equipment of Anomaly Detection Simulation Key Technology, Computer Simulation, 2016, pp. 425-429, vol. 33 No. 1.

(Continued)

*Primary Examiner* — David Orange
(74) *Attorney, Agent, or Firm* — Bayramoglu Law Offices LLC

(57) ABSTRACT

A window inspecting method and device for a bearing holder are disclosed to solve the technical problem that windows of existing bearing holders are generally inspected manually, which consumes manpower and makes a quality inspection slow. The method includes: comparing and matching each window image in an initial window image set with each other; selecting a plurality of anomaly-matched window images from comparing and matching results to obtain a plurality of anomaly window images; identifying and labeling an anomaly region image in the anomaly-matched window image to obtain an anomaly-labeled region; performing window anomaly classification on the anomaly-labeled region to obtain a window anomaly type; photographing an anomaly window corresponding to a window anomaly type for a second time to obtain an actual (Continued)

window anomaly image; and performing two-dimensional coordinate system related ray localization to obtain position information of the anomaly window.

7 Claims, 5 Drawing Sheets

(51) Int. Cl.

| | |
|---|---|
| *G06T 7/174* | (2017.01) |
| *G06T 7/60* | (2017.01) |
| *G06T 7/73* | (2017.01) |
| *G06V 10/44* | (2022.01) |
| *G06V 10/60* | (2022.01) |
| *G06V 10/74* | (2022.01) |
| *G06V 10/75* | (2022.01) |
| *G06V 10/764* | (2022.01) |
| *G06V 10/82* | (2022.01) |
| *G06V 20/50* | (2022.01) |
| *G06V 20/70* | (2022.01) |
| *H04N 23/695* | (2023.01) |

(52) U.S. Cl.
CPC ................ *G06T 7/74* (2017.01); *G06V 10/44* (2022.01); *G06V 10/60* (2022.01); *G06V 10/751* (2022.01); *G06V 10/761* (2022.01); *G06V 10/764* (2022.01); *G06V 10/82* (2022.01); *G06V 20/50* (2022.01); *G06V 20/70* (2022.01); *H04N 23/695* (2023.01); *G06T 2207/10016* (2013.01); *G06T 2207/20061* (2013.01); *G06T 2207/20081* (2013.01); *G06T 2207/20084* (2013.01); *G06T 2207/30108* (2013.01)

(56) References Cited

U.S. PATENT DOCUMENTS

| | | | |
|---|---|---|---|
| 2019/0114754 A1 | 4/2019 | Huang et al. | |
| 2021/0019878 A1* | 1/2021 | Iizawa | G06V 20/00 |
| 2022/0415020 A1* | 12/2022 | Kashanipour | G01N 23/18 |

FOREIGN PATENT DOCUMENTS

| | | |
|---|---|---|
| CN | 115187548 A | 10/2022 |
| CN | 115311267 A | 11/2022 |
| CN | 115393363 A | 11/2022 |
| CN | 115953397 A | 4/2023 |
| WO | 2013024613 A1 | 2/2013 |
| WO | 2021000524 A1 | 1/2021 |

OTHER PUBLICATIONS

Ruan Jiaojiao, Study on Key Technologies of On-line Cage Inspection Equipment Based on Image Processing, Dissertation Submitted to Zhejiang University of Technology for the Degree of Master, 2017, pp. 1-77, College of Mechanical Engineering Zhejiang University of Technology.

Tongyang Pan, et al., Intelligent fault identification for industrial automation system via multi-scale convolutional generative adversarial network with partially labeled samples, ISA Transactions, 2020, pp. 379-389, vol. 101.

* cited by examiner

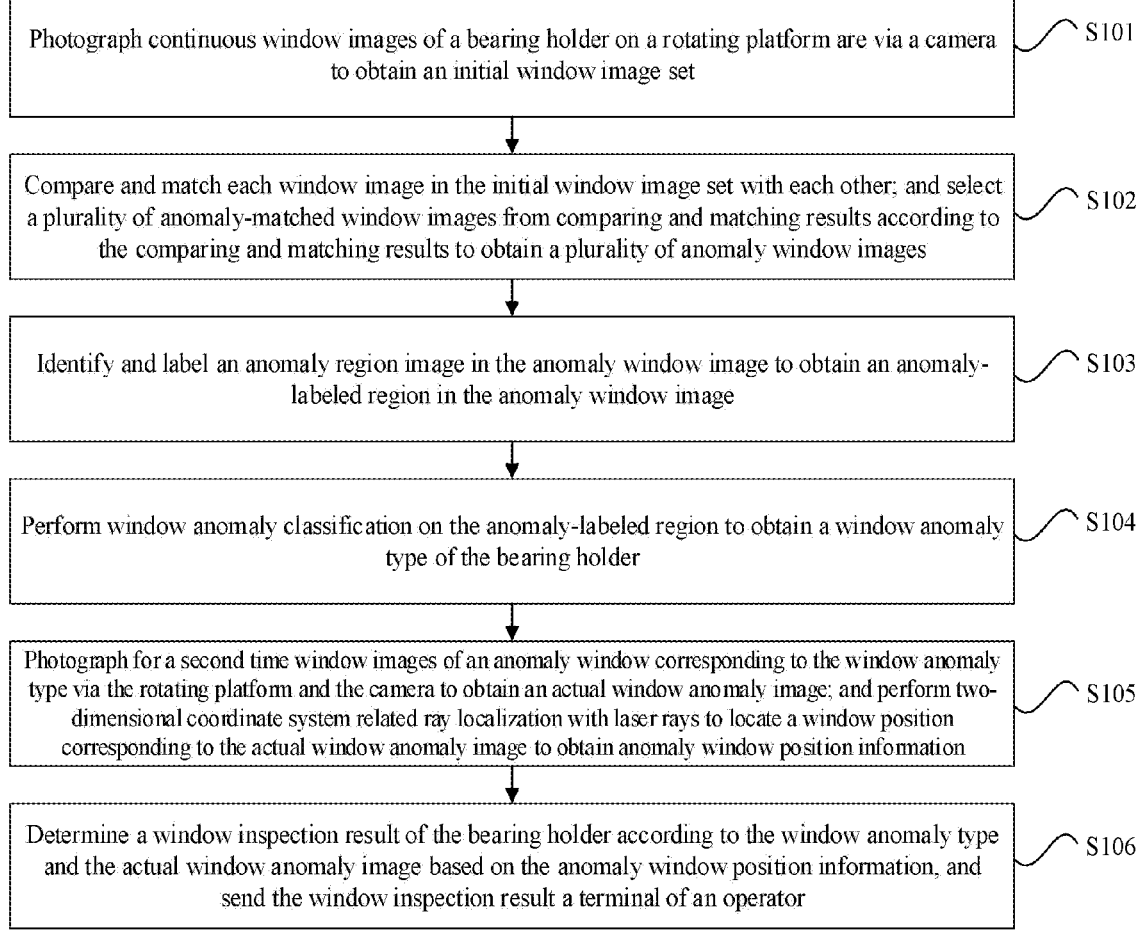

Photograph continuous window images of a bearing holder on a rotating platform are via a camera to obtain an initial window image set — S101

Compare and match each window image in the initial window image set with each other; and select a plurality of anomaly-matched window images from comparing and matching results according to the comparing and matching results to obtain a plurality of anomaly window images — S102

Identify and label an anomaly region image in the anomaly window image to obtain an anomaly-labeled region in the anomaly window image — S103

Perform window anomaly classification on the anomaly-labeled region to obtain a window anomaly type of the bearing holder — S104

Photograph for a second time window images of an anomaly window corresponding to the window anomaly type via the rotating platform and the camera to obtain an actual window anomaly image; and perform two-dimensional coordinate system related ray localization with laser rays to locate a window position corresponding to the actual window anomaly image to obtain anomaly window position information — S105

Determine a window inspection result of the bearing holder according to the window anomaly type and the actual window anomaly image based on the anomaly window position information, and send the window inspection result a terminal of an operator — S106

FIG. 1

WINDOW INSPECTING METHOD AND DEVICE FOR BEARING HOLDER

CROSS REFERENCE TO RELATED APPLICATIONS

This application is a continuation application of International Application No. PCT/CN2023/106117, filed on Jul. 6, 2023, which is based upon and claims priority to Chinese Patent Application No. 202310382002.0, filed on Apr. 12, 2023, the entire contents of which are incorporated herein by reference.

TECHNICAL FIELD

The present application relates to the field of image inspection relating to bearing holders, and in particular, to a window inspecting method and device for a bearing holder.

BACKGROUND

A cage (i.e., a bearing retainer, also referred to as a bearing holder) refers to a part of a bearing which partially wraps all or part of the rolling elements and moves therewith to isolate the rolling elements and usually also to guide and retain the rolling elements within the bearing.

At present, the quality of bearing holders is generally inspected by manual methods, in which each bearing holder is carefully inspected step by step by the working staff. Especially for some bearing holders with special window processing requirements, the window dimension, window size, window lintel slope and whether the hole is open need to be manually inspected, which consumes a lot of manpower and makes the quality inspection slow. In addition, the manual inspection is dependent on the experience and carefulness of the operator, which is easy to cause certain human errors and affect the product quality of the bearing holder, so it is difficult to control the pass rate of the finished products of bearing holders.

SUMMARY

Embodiments of the present application provide a window inspecting method and device for a bearing holder to solve the following technical problems: the windows of existing bearing holders are generally inspected manually, which consumes a lot of manpower and makes the quality inspection slow, and it is difficult to carry out detailed inspection on all aspects of windows, thus affecting the pass rate of the finished products of bearing holders.

The embodiments of the present application adopt the following technical solutions.

In an aspect, embodiments of the present application provide a window inspecting method for a bearing holder. The method includes: photographing continuous window images of the bearing holder on a rotating platform via a camera to obtain an initial window image set; comparing and matching each window image in the initial window image set with each other; and selecting, according to comparing and matching results, a plurality of anomaly-matched window images in the comparing and matching results to obtain a plurality of anomaly window images; identifying and labeling an anomaly region image in the anomaly window image to obtain an anomaly-labeled region in the anomaly window image; performing window anomaly classification on the anomaly-labeled region to obtain a window anomaly type of the bearing holder; wherein the window anomaly type includes at least any one or more of: a window size anomaly, a window lintel slope anomaly, a hole patency anomaly, and a groove depth anomaly; photographing for a second time window images of an anomaly window corresponding to the window anomaly type via the rotating platform and the camera to obtain an actual window anomaly image; and performing two-dimensional coordinate system related ray localization with laser rays to locate a window position corresponding to the actual window anomaly image, to obtain anomaly window position information; determining a window inspection result of the bearing holder according to the window anomaly type and the actual window anomaly image based on the anomaly window position information, and sending the window inspection result to a terminal of an operator.

According to an embodiment of the present application, the bearing holder is subjected to window inspection via the rotating platform and the camera, all the identified windows are compared with each other, and then an anomaly window is selected and a window anomaly type is determined; after that, the position of the anomaly window and the anomaly type can be accurately identified, and are combined with the actual window anomaly image and sent to the operator at the rear end. In this way, the workload of the operator for window inspection is greatly reduced while the accuracy is also high; and in combination with laser positioning, the method can help the operator to quickly find the windows with anomalies and determine the corresponding anomaly fault types. Therefore, the labor cost and improving the inspection efficiency are greatly reduced, and a detailed inspection can be carried out on the windows in all aspects, reducing the human errors and improving the pass rate of the finished products of bearing holders.

In a possible implementation, the photographing continuous window images by a camera on the bearing holder on a rotating platform to obtain an initial window image set, specifically includes: acquiring drawing information of a bearing holder to be produced, wherein the drawing information includes at least: a window count, a window size, a bearing holder radius, and window lintel processing parameters; inputting the window count and the bearing holder radius in the drawing information to a control unit of a rotating platform control system; wherein the rotating platform control system includes the control unit, a servo motor unit and a laser emitting unit; determining an angular rate of the rotating platform according to the window count and based on a photographing time interval of the camera to photograph each window of the bearing holder; controlling operation of the rotating platform according to the angular rate of the rotating platform, and photographing continuous window images of the bearing holder based on the camera to obtain a partial window image set; wherein the partial window image set is an image set photographed at a plurality of first time intervals from the beginning of the camera; performing area detection on a window lintel pixel of a gray-scale image set of the partial window image set according to a pre-set Canny operator to obtain an actual window lintel pixel area; and comparing an area value of the actual window lintel pixel area with a standard window lintel pixel area; determining a successfully-matched actual window lintel pixel area as a complete window lintel pixel value; determining a window image corresponding to the complete window lintel pixel value as a first window image; and re-feeding back the window image to the control unit of the rotating platform control system according to the first window image and a corresponding photographing time interval of the camera, so that each window of the bearing holder is completely photographed to obtain the initial window image set.

According to an embodiment of the present application, the servo motor of the rotating platform and the photographing time interval of the camera are controlled to match with each other, and with image edge detection of the Canny operator, it is ensured that each window can be completely acquired for any different kind of bearing holder. Therefore, the rotation of the servo motor and the photographing of the camera can be combined with each other, thereby obtaining an initial window image set of all the windows in the bearing holder.

In a possible implementation, the comparing and matching each window image in the initial window image set with each other includes: performing gray-scale pre-processing on each window image to obtain a plurality of gray-scale window images; performing region division on the gray-scale window image based on a pre-set division line according to an actual pixel size of the gray-scale window image to obtain a gray-scale pixel region; wherein each gray-scale window image is divided into 9 gray-scale pixel regions; traversing pixel features in each of the gray-scale pixel regions; wherein the pixel feature includes a bright-dark gradient feature of each pixel point and a corresponding pixel coordinate position feature; performing similarity comparison and matching between various gray-scale window images on a plurality of pixel features in one-to-one correspondence to the gray-scale pixel regions of the plurality of gray-scale window images according to the pixel features in each of the gray-scale pixel regions to obtain a comparing and matching result; wherein the comparing and matching result includes: a normal match and an anomaly match; the similarity comparison and matching is a similarity matching of corresponding pixel features between any two sets of gray-scale window images.

According to an embodiment of the present application, by comparing and matching any two gray-scale window images in the initial window image set with each other, an anomaly window image can be quickly found out to obtain the comparison set, thereby reducing the difficulty of image processing, and saving the overall inspection time of the bearing holder.

In a possible implementation, the selecting, according to comparing and matching results, a plurality of anomaly-matched window images from the comparing and matching results to obtain a plurality of anomaly window images, specifically includes: if the comparing and matching result is an anomaly match, acquiring a plurality of sets of gray-scale anomaly-matched window images; extracting distinguishing pixel features and corresponding distinguishing gray-scale pixel regions in the plurality of sets of gray-scale window images; and acquiring normal gray-scale pixel regions according to a plurality of normal window images of which the comparing and matching results are normal matches; performing similarity learning training on cross pixel features of the distinguishing gray-scale pixel regions and the normal gray-scale pixel regions according to a convolution neural network and a Sigmoid function to obtain a cross-classification network model; wherein the cross-classification network model has a basic architecture of twin neural network; cross-classifying the plurality of sets of gray-scale window images via the cross-classification network model based on different allocation weights of the distinguishing gray-scale pixel region and the normal gray-scale pixel region to eliminate normal pixel features in the distinguishing pixel features and obtain anomaly pixel features in the distinguishing pixel features; wherein the anomaly pixel feature is a pixel feature corresponding to an anomaly window image in each set of gray-scale window images; and selecting a plurality of gray-scale pixel regions corresponding to the anomaly pixel features to obtain the plurality of anomaly window images corresponding to the anomaly pixel features.

According to an embodiment of the present application, a plurality of sets of gray-scale window images are cross-classified via the cross-classification network model to select a window image actually having an anomaly pixel feature in the comparation and matching set, i.e., an anomaly window image.

In a possible implementation, before the identifying and labeling an anomaly region image in the anomaly window image to obtain an anomaly-labeled region in the anomaly window image, the method further includes: performing image sequence encoding processing on all the window images in the initial window image set to obtain an encoded data set; and performing anomaly labeling on encoding sequence numbers corresponding to the anomaly window images in the encoded data set according to corresponding positions of the plurality of anomaly window images in the initial window image set to obtain anomaly encoding sequence numbers.

According to an embodiment of the present application, firstly, all the window images in the initial window image set are encoded, and then the identified anomaly window images are individually labeled to obtain anomaly encoding sequence numbers. In this way, the accurate location of each anomaly window is facilitated, and the operator is enabled to find the corresponding anomaly window according to the labeled anomaly window image.

In a possible implementation, the identifying and labeling an anomaly region image in the anomaly window image to obtain an anomaly-labeled region in the anomaly window image, specifically includes: performing image region division on an anomaly window image corresponding to the anomaly encoding sequence number according to a gray-scale pixel region corresponding to an anomaly pixel feature to obtain an original anomaly region image; performing gray-scale processing on the original anomaly region image; performing primary edge image feature constraint processing on the original anomaly region image through second-order differential calculation after the gray-scale processing to obtain a candidate anomaly region; calculating a minimum pixel distance between a centroid of the candidate anomaly region and an edge image feature region to obtain a distance constraint condition; wherein the edge image feature region is an edge pixel region of the candidate anomaly region; constructing an edge slope coordinate system based on the candidate anomaly region according to an image corner point in the candidate anomaly region and the centroid; performing direction positioning of a slope angle on image slope pixels in the candidate anomaly region to obtain a direction constraint condition according to the edge slope coordinate system; and performing secondary edge image feature constraint processing on the candidate anomaly region according to the distance constraint condition and the direction constraint condition to obtain the anomaly-labeled region.

According to an embodiment of the present application, the gray-scale image is subjected to edge constraint processing through second-order differential calculation according to the original anomaly region image in the plurality of anomaly window images, and a candidate anomaly region is located, then gray-scale pixels in the candidate anomaly region are subjected to secondary image edge feature constraint processing according to the distance constraint condition and the direction constraint condition, and the anomaly gray-scale pixels are further precisely constrained and located and labeled, thereby obtaining the anomaly-labeled region corresponding to the anomaly gray-scale pixels.

In a possible implementation, the performing window anomaly classification on the anomaly-labeled region to obtain a window anomaly type of the bearing holder, specifically includes: performing window anomaly classification matching on the anomaly-labeled region via a window anomaly template in a historical window anomaly database; and if the matching is successful, determining a window anomaly type corresponding to the window anomaly template as a window anomaly type of the anomaly-labeled region; if the matching is unsuccessful, determining a window anomaly type of the anomaly-labeled region; performing linear detection on pixel point sets on cross-beam pixels and longitudinal-beam pixels of a window in the anomaly-labeled region via a Hough transform linear detection algorithm to obtain window size information; performing linear slope calculation on pixel sets of a same brightness gradient in the anomaly-labeled region according to a Hough transform to obtain window lintel slope information; identifying disjoint curves in the anomaly-labeled region via a Hough transform circle detection algorithm to obtain a circular contour region; and calculating areas of same pixels in the circular contour region according to adjacent connected domains in the anomaly-labeled region to obtain hole-area information; calculating a pixel length of a concave-convex region in the anomaly-labeled region to obtain groove depth information; and comparing the drawing information with the window size information, the window lintel slope information, the hole-area information and the groove depth information to determine a window anomaly type of the anomaly-labeled region.

According to the embodiment of the present application, a plurality of anomaly-labeled regions are identified and compared with the historical window anomaly database first to quickly match and identify some common anomaly types, and then the types of unidentified anomaly-labeled regions are determined in various ways, i.e., pixel curves, pixel area, continuous length of same pixels and adjacent connected domains of pixels in the anomaly-labeled region are identified and determined via the Hough detection algorithm to obtain corresponding window size information, window lintel slope information, hole-area information and groove depth information, and theses information are then compared with corresponding standard dimension ranges in the uploaded drawing information to identify the corresponding window anomaly type of the anomaly-labeled region.

In a possible implementation, the photographing for a second time window images of an anomaly window corresponding to the window anomaly type via the rotating platform and the camera to obtain an actual window anomaly image, specifically includes: acquiring an anomaly encoding sequence number of an anomaly window corresponding to the window anomaly type; performing rotation feedback control on a servo motor of the rotating platform according to a sequence position of the anomaly encoding sequence number in the encoded data set so that an anomaly window corresponding to the anomaly encoding sequence number faces the camera; wherein the rotation feedback control controls rotation operation of the servo motor according to a photographing time interval between the anomaly encoding sequence number and a current encoding sequence number; and photographing for a second time window images of a plurality of anomaly windows corresponding to the anomaly encoding sequence number by the camera to obtain a plurality of actual window anomaly images.

According to an embodiment of the present application, the rotation of the motor in the rotating platform is controlled according to the anomaly encoding sequence number of the anomaly window, and window images of the anomaly window are photographed for a second time to obtain actual window anomaly images for a secondary inspection on the anomaly window. The window images can also provide the operator a standard for determining whether the window has an anomaly which, in combination with the type of the anomaly window detected by the system, facilitates review of the operator.

In a possible implementation, the performing two-dimensional coordinate system related ray localization with laser rays to locate a window position corresponding to the actual window anomaly image, to obtain anomaly window position information, specifically includes: acquiring all actual window anomaly images and a plurality of corresponding anomaly encoding sequence numbers, and then performing single-line laser irradiation with laser rays on a plurality of anomaly windows corresponding to the actual window anomaly images to obtain a plurality of laser rays; performing ray tilt angle positioning on the plurality of laser rays based on a pre-set two-dimensional coordinate system on the rotating platform to obtain a plurality of ray tilt angles; and determining anomaly window position information of a plurality of anomaly windows according to the plurality of ray tilt angles and the plurality of anomaly encoding sequence numbers.

According to an embodiment of the present application, after all the actual window anomaly images and the plurality of corresponding anomaly encoding sequence numbers are obtained, a laser emitting device in the middle of the rotating platform irradiates the anomaly window to form a plurality of laser rays, then a tilt angle of each anomaly window is determined based on the pre-set two-dimensional coordinate system on the rotating platform, and then according to the corresponding anomaly encoding sequence number, the position information of the anomaly window is finally determined, which helps the operator to find the corresponding anomaly window in time according to the position information of the anomaly window obtained by the tilt angle and the anomaly encoding sequence number, saving the operator's search time and further improving the window inspection efficiency of the bearing holder.

In another aspect, embodiments of the present application further provide a window inspecting device for a bearing holder. The device includes: at least one processor; and a memory in communication connection to the at least one processor; wherein the memory stores instructions executable by the at least one processor to enable the at least one processor to perform the window inspecting method for a bearing holder according to any of the above embodiments.

In the present application, the bearing holder is subjected to window inspection via the rotating platform and the camera, all the identified windows are compared with each other, and then an anomaly window is selected and a window anomaly type is determined; after that, the position of the anomaly window and the anomaly type can be accurately identified, and are combined with the actual window anomaly images and sent to the operator at the rear end. In this way, the workload of the operator for window inspection is greatly reduced while the accuracy is also high;

and in combination with laser positioning, the method can help the operator to quickly find the windows with anomalies and determine the corresponding anomaly fault types. Therefore, the labor cost and improving the inspection efficiency are greatly reduced, and a detailed inspection can be carried out on the windows in all aspects, reducing the human errors and improving the pass rate of the finished products of bearing holders.

BRIEF DESCRIPTION OF THE DRAWINGS

In order to explain the technical solutions of the embodiments of the present application or the prior art more clearly, the following will briefly introduce the drawings which need to be used in the description of the embodiments or the prior art. Obviously, the drawings in the following description are merely some embodiments of the present application, and it would have been obvious for a person skilled in the art to obtain other drawings according to these drawings without involving any inventive effort. In the drawings:

FIG. 1 is a flowchart showing a window inspecting method for a bearing holder according to an embodiment of the present application;

DETAILED DESCRIPTION OF THE EMBODIMENTS

Figure 2:
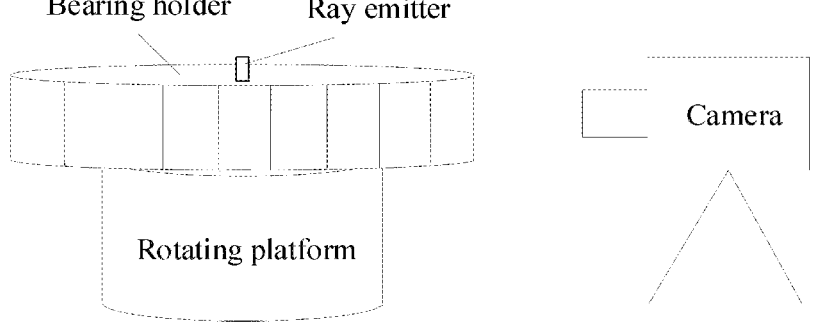
FIG. 2 is an overall schematic diagram showing window inspection of a bearing holder according to an embodiment of the present application.

In order to enable a person skilled in the art to better understand the technical solution of the present application, a clear and complete description of the technical solution of the embodiments of the present application will be provided below in conjunction with the accompanying drawings of the embodiments of the present application, and it is obvious that the embodiments described are only a part of the embodiments of the present application, rather than all the embodiments. Based on the embodiments of this description, all other embodiments obtained by a person skilled in the art without involving any inventive effort should fall within the scope of protection of the present application.

An embodiment of the present application provides a window inspecting method for a bearing holder, and as shown in FIG. 1, the window inspecting method for a bearing holder specifically includes steps S101-S106:

S101: Continuous window images of a bearing holder on a rotating platform are photographed via a camera to obtain an initial window image set.

In particular, drawing information of a bearing holder to be produced is acquired, wherein the drawing information includes at least: a window count, a window size, a bearing holder radius, and window lintel processing parameters. The window count in the drawing information and the bearing holder radius are input to a control unit of a rotating platform control system; wherein the rotating platform control system includes the control unit, a servo motor unit and a laser emitting unit.

Further, an angular rate of the rotating platform is determined according to the window count and based on a photographing time interval of the camera to photograph each window of the bearing holder.

Figure 4:
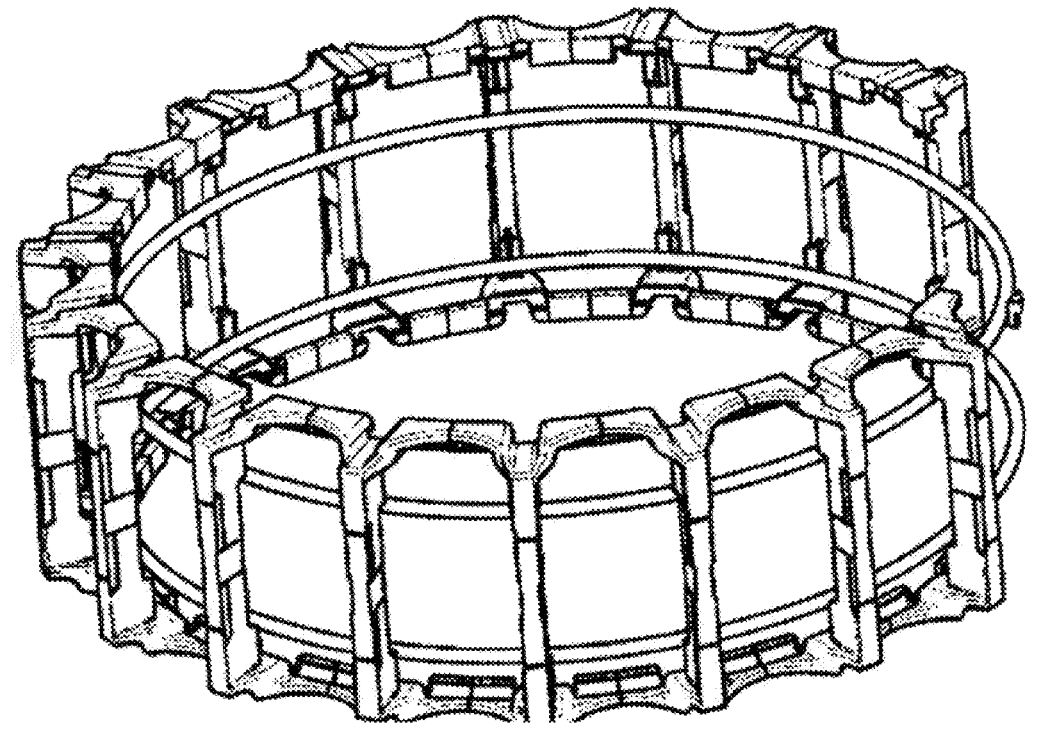
FIG. 4 is a schematic diagram showing the structure of windows of a bearing holder according to an embodiment of the present application.
Figure 5:
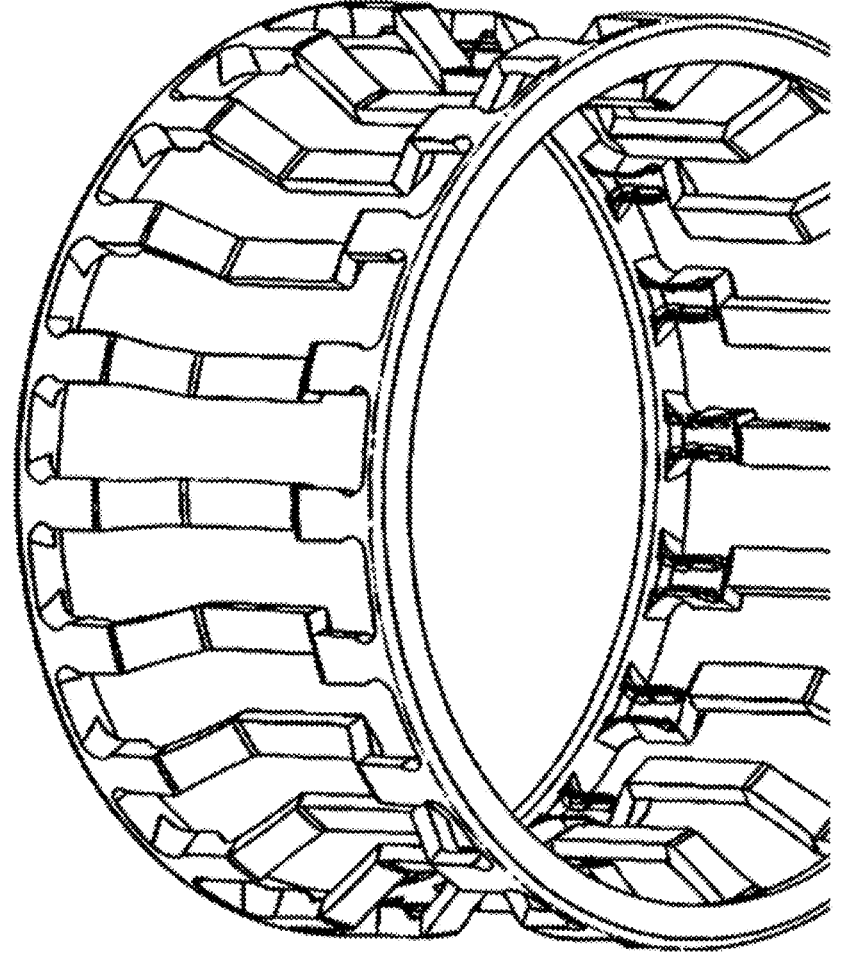
FIG. 5 is a schematic diagram showing the structure of windows and window lintels of a bearing holder according to an embodiment of the present application.

In an embodiment, FIG. 2 is an overall schematic diagram showing window inspection of a bearing holder according to an embodiment of the present application. As shown in FIG. 2, drawing information for a bearing holder to be produced is first uploaded to a window inspecting system for the bearing holder. FIG. 4 is a schematic diagram showing the structure of a window of a bearing holder according to an embodiment of the present application, and FIG. 5 is a schematic diagram showing the structure of a window and a window lintel of a bearing holder according to an embodiment of the present application. As shown in FIGS. 4 and 5, there are various complicated types of structure of the window and the window lintel of the bearing holder to adapt to various operating characteristics of a bearing, so that qualified inspection of the window of the bearing holder is a prerequisite for stable operation of the bearing. For example, it needs to produce 36 windows having a length and width of 4*6 cm, a thickness of 1 cm and a radius of 35 cm, and window lintels having 4 slopes, with each slope having an angle of 45 degrees, each window lintel having a front face with three holes having a radius of 2 mm, and each window lintel having a bottom with two grooves having a width of 1 cm, all for smooth circulation of a lubricating liquid. Then, the window count information in the drawing information and the bearing holder radius information are input into the rotating platform control system through the window inspecting system, and based on the photographing time interval of the camera, a rotation angular rate of the servo motor is calculated, so that the camera and the rotating platform can cooperate with each other to photograph each window of the bearing holder.

Further, operation of the rotating platform is controlled according to the angular rate of the rotating platform, and continuous window images of the bearing holder are photographed based on the camera to obtain a partial window image set. The partial window image set is an image set photographed at a plurality of first time intervals from the beginning of the camera, for example, the image set is photographed at the first 5 time intervals from the beginning of the camera.

Further, area detection is performed on a window lintel pixel of a gray-scale image set of the partial window image set according to a pre-set Canny operator to obtain an actual window lintel pixel area. An area value of the actual window lintel pixel area is compared with a standard window lintel pixel area. A successfully-matched actual window lintel pixel area is determined as a complete window lintel pixel value. A window image corresponding to the complete window lintel pixel value is determined as a first window image. Then, the window image is re-fed back to the control unit of the rotating platform control system according to the first window image and a corresponding photographing time interval of the camera, so that each window of the bearing holder is completely photographed to obtain the initial window image set.

In an embodiment, as shown in FIG. 2, in order to enable the camera and the rotating platform to be sufficiently matched, i.e., each image acquired by the camera contains a completed bearing holding window, partial photographing pre-processing is firstly performed to determine the starting time of the servo motor in the rotating platform, and the areas of pixels of the window lintels in a gray-scale image set of the partial window image set are detected on through rough extraction with the Canny operator to obtain an actual window lintel pixel area, i.e., the window lintel pixel area in each image is calculated one by one, then is converted into a standard pixel area of the window lintel according to the standard area of the window lintel in the drawing information, which is then compared with the area value of the actual window lintel pixel area to determine the successfully-matched actual window lintel pixel area as a complete window lintel pixel value. The window image corresponding to the identified complete window lintel pixel value is determined as a first window image, and then the first window image and a corresponding photographing time interval of the camera are fed back to the control unit to control the rotation operation of the servo motor, so that the angular rate of the servo motor and the photographing time of the camera are matched with each other, ensuring that each window of the bearing holder can be photographed completely.

S102: Each window image in the initial window image set is compared and matched with each other, and a plurality of anomaly-matched window images are selected from comparing and matching results according to the comparing and matching results to obtain a plurality of anomaly window images.

In particular, each window image is subjected to grayscale pre-processing to obtain a plurality of gray-scale window images. Region division is performed on the grayscale window image based on a pre-set division line according to an actual pixel size of the gray-scale window image to obtain a gray-scale pixel region; wherein each gray-scale window image is divided into 9 gray-scale pixel regions.

Further, pixel features in each gray-scale pixel region are traversed. The pixel feature includes a bright-dark gradient feature of each pixel point and a corresponding pixel coordinate position feature. According to the pixel features in each gray-scale pixel region, similarity comparison and matching is performed between various gray-scale window images on a plurality of pixel features in one-to-one correspondence to the gray-scale pixel regions of the plurality of gray-scale window images to obtain a comparing and matching result. The comparing and matching result includes: a normal match and an anomaly match. The similarity comparison and matching is a similarity matching of corresponding pixel features between any two sets of gray-scale window images.

In an embodiment, firstly, each window image in the acquired initial window image set is subjected to gray-scale pre-processing, then according to the actual pixel size of the gray-scale window image and based on two horizontal and two vertical division lines, each gray-scale window image is divided to obtain 9 gray-scale pixel regions, and then according to the bright-dark gradient feature of each pixel point traversed and the corresponding pixel coordinate position feature, similarity comparison and matching is performed between various gray-scale window images on a plurality of pixel features in one-to-one correspondence to the gray-scale pixel regions of the plurality of gray-scale window images; i.e., the bright-dark gradient features of relevant pixel points and the corresponding pixel coordinate position features of same gray-scale pixel regions in any two gray-scale images in the initial window image set are compared one by one, and finally a plurality of comparing and matching results are obtained.

Further, if the comparing and matching result is an anomaly match, a plurality of sets of anomaly-matched gray-scale window images are acquired. Distinguishing pixel features and corresponding distinguishing gray-scale pixel regions in the plurality of sets of gray-scale window images are extracted. Normal gray-scale pixel regions are acquired according to a plurality of normal window images of which the comparing and matching results are normal matches.

Further, similarity learning training is performed on cross pixel features of the distinguishing gray-scale pixel regions and the normal gray-scale pixel regions to obtain a cross-classification network model according to a convolution neural network and a Sigmoid function, and the cross-classification network model has a basic architecture of twinning neural network. The plurality of sets of gray-scale window images are cross-classified via the cross-classification network model based on different allocation weights of the distinguishing gray-scale pixel regions and the normal gray-scale pixel regions to eliminate normal pixel features in the distinguishing pixel features and obtain anomaly pixel features in the distinguishing pixel features. The anomaly pixel feature is a pixel feature corresponding to an anomaly window image in each set of gray-scale window images. The normal pixel feature is a pixel feature corresponding to a normal window image in each set of gray-scale window images. Then a plurality of gray-scale pixel regions corresponding to the anomaly pixel features are selected to obtain the plurality of anomaly window images corresponding to the anomaly pixel features.

In an embodiment, the distinguishing pixel features and corresponding distinguishing gray-scale pixel regions are extracted from a plurality of sets of gray-scale anomaly-matched window images in the comparing and matching results, and normal gray-scale pixel regions in the plurality of normal window images of normal matches are obtained at the same time; then the cross-classification network model for distinguishing cross-classification on gray-scale pixel region images is learned and trained by image similarity comparison of the convolution neural network and the Sigmoid function; based on an image template of the normal gray-scale pixel regions, the plurality of sets of gray-scale anomaly-matched window images are cross-classified to identify normal gray-scale window images in each set of gray-scale window images, and then the normal pixel features are eliminated from each set of distinguishing pixel features, i.e., the corresponding normal gray-scale window images are eliminated, and only the anomaly window images corresponding to the anomaly pixel features are retained, thereby completing the classification on the plurality of sets of gray-scale anomaly-matched window images, and finally obtaining each classified anomaly window image.

S103: An anomaly region image in the anomaly window image is identified and labeled to obtain an anomaly-labeled region in the anomaly window image.

In particular, image sequence encoding processing is performed on all the window images in the initial window image set to obtain an encoded data set. Anomaly labeling is performed on encoding sequence numbers corresponding to the anomaly window images in the encoded data set according to corresponding positions of the plurality of anomaly window images in the initial window image set to obtain anomaly encoding sequence numbers.

In an embodiment, after the initial window image set is acquired, each window image in the initial window image set is encoded with an image sequence number to construct an encoded data set. Then, after an anomaly window image is identified, anomaly labeling is performed on the encoding sequence number corresponding to the anomaly window image, for example, color labeling or special marker labeling is performed, and finally a labeled anomaly encoding sequence number is obtained.

Further, image region division is performed on an anomaly window image corresponding to the anomaly encoding sequence number according to a gray-scale pixel region corresponding to an anomaly pixel feature to obtain an original anomaly region image. Gray-scale processing is performed on the original anomaly region image.

Further, primary edge image feature constraint processing is performed on the original anomaly region image through second-order differential calculation after the gray-scale processing to obtain a candidate anomaly region. A minimum pixel distance between a centroid of the candidate anomaly region and an edge image feature region is calculated to obtain a distance constraint condition. The edge image feature region is an edge pixel region of the candidate anomaly region. An edge slope coordinate system is constructed based on the candidate anomaly region according to an image corner point in the candidate anomaly region and the centroid. Direction positioning of a slope angle is performed on image slope pixels in the candidate anomaly region to obtain a direction constraint condition. The secondary edge image feature constraint processing is performed on the candidate anomaly region according to the distance constraint condition and the direction constraint condition to obtain the anomaly-labeled region.

In an embodiment, firstly, the gray-scale pixel region in the cross-classification network model corresponding to the anomaly pixel feature at the input end is acquired, i.e., the anomaly window image corresponding to the anomaly encoding sequence number is determined, and then based on a division line, the anomaly window image is subjected to image region division, and is defined as an original anomaly region image. Then the feature constraint process is performed on the edge image in the original anomaly region image through second-order differential calculation to obtain a relatively rough candidate anomaly region, and then the image corner points and the centroid in the candidate anomaly region are selected for direction positioning of the title angle of the image slope pixels in the candidate anomaly region, and the minimum pixel distance is calculated between the centroid of the candidate anomaly region and the edge image feature region. Secondary feature constraint processing is performed on the image edge features of the candidate anomaly region, i.e., the candidate region is subjected to image edge feature constraining using the direction constraint condition and the distance constraint condition to obtain a precise anomaly region of the anomaly window image, and then the precise anomaly region is box selected to be labeled to obtain a box selected anomaly-labeled region.

As a possible implementation, the minimum pixel distance in the distance constraint condition is calculated as $D_d=\{\sqrt{(x_i-\overline{x})^2-(y_i-\overline{y})^2},\ (x_i,\ y_i)\in T\}$, wherein, T is a top boundary region of a window anomaly texture image in the candidate anomaly region, $(\overline{x},\ \overline{y})$ is a centroid of an anomaly candidate edge of a window anomaly texture image, $x_i$ and $y_i$ are the coordinates of each pixel point in the candidate anomaly region, and $D_d$ is a minimum pixel distance. Direction positioning of a tilt angle of image slope pixels in the direction constraint condition includes: according to $$\theta = 0.5\arctan\left(\frac{2M_{11}}{M_{20} - M_{02}}\right),$$

a relative angle $\theta$ of the image slope pixels is obtained, $M_{11}$, $M_{20}$, and $M_{02}$ respectively represent different image corner points in the candidate anomaly region, in which $M_{ij}=\Sigma_{(r,c)\in R}(r_0-r)^i(c_0-c)^j$ is an image corner point, R is a candidate anomaly region, $(r_0, c_0)$ is a centroid of a candidate region, and (r, c) are intersection coordinates of the window anomaly texture image in the candidate anomaly region and the edge thereof.

S104: Window anomaly classification is performed on the anomaly-labeled region to obtain a window anomaly type of the bearing holder according to a historical window anomaly database. The window anomaly type includes at least any one or more of: a window size anomaly, a window a lintel slope anomaly, a hole patency anomaly and a groove depth anomaly.

In particular, window anomaly classification matching is performed on the anomaly-labeled region via a window anomaly template in the historical window anomaly database. If the matching is successful, the window anomaly type corresponding to the window anomaly template is determined as the window anomaly type of the anomaly-labeled region.

In an embodiment, the box selected anomaly-labeled region is matched with the window anomaly template in the historical window anomaly database to perform image template matching, for example, parameter information such as window size information, window lintel slope information, hole-area information and groove depth information in the window anomaly template is compared and matched with corresponding information in the anomaly-labeled region, and if the comparation and matching is successful, the window anomaly type corresponding to the window anomaly template is determined as the window anomaly type corresponding to the anomaly-labeled region, i.e., the window anomaly type corresponding to the anomaly window.

Further, if the matching is unsuccessful, a window anomaly type of the anomaly-labeled region is determined. Linear detection is performed on pixel point sets on crossbeam pixels and longitudinal-beam pixels of a window in the anomaly-labeled region via a Hough transform linear inspection algorithm to obtain window size information. Linear slope calculation is performed on pixel sets of a same brightness gradient in the anomaly-labeled region according to a Hough transform to obtain window lintel slope information. Disjoint curves in the anomaly-labeled region are identified via a Hough transform circle inspection algorithm to obtain a circular contour region. Same pixels in the circular contour region are calculated according to adjacent connected domains in the anomaly-labeled region to obtain hole-area information. A pixel length of a concave-convex region in the anomaly-labeled region is calculated to obtain groove depth information.

Further, the drawing information is compared with the window size information, the window lintel slope information, the hole-area information, and the groove depth information to determine a window anomaly type of the anomaly-labeled region.

Figure 6:
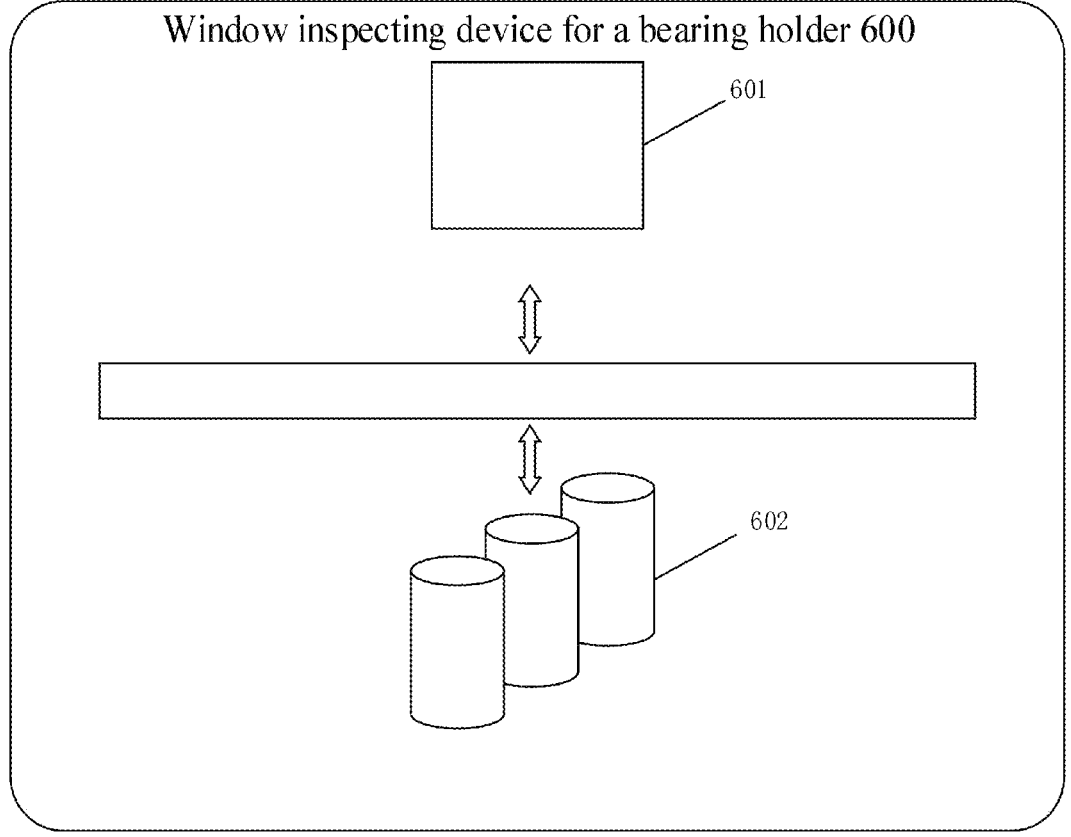
FIG. 6 is a schematic diagram showing a window inspecting device for a bearing holder according to an embodiment of the present application.

In an embodiment, as shown in FIGS. 5 and 6, the relevant window anomaly type is determined for the image of the anomaly-labeled region which does not conform to the window anomaly template, information about the brightness characteristics, same pixel arrangement, adjacent connected domain distribution and same pixel area size of various pixel sets of the window is identified and acquired using the pixel arrangement characteristics in the box selected anomaly-labeled region and based on the Hough transform straight linear detection algorithm and the Hough transform circle detection algorithm, and window size information, window lintel slope information, hole-area information and groove depth information, etc. are acquired. Then, the error range is compared with the drawing information uploaded to the window detection system, for example, if the error between a converted actual region of a single hole in the hole-area information and the standard hole-area in the drawing information is controlled within 1%, it is considered that the hole-area information is qualified information, otherwise, it is hole patency anomaly information. Finally, all the unqualified window size information, window lintel slope information and groove depth information are respectively determined as window size anomaly information, window lintel gradient anomaly information and groove depth anomaly information, i.e., the window anomaly type corresponding to each anomaly window is obtained.

S105: Window images of an anomaly window corresponding to the window anomaly type are photographed for a second time via the rotating platform and the camera to obtain an actual window anomaly image. Two-dimensional coordinate system related ray localization is performed with laser rays to locate a window position corresponding to the actual window anomaly image to obtain anomaly window position information.

In particular, an anomaly encoding sequence number of an anomaly window corresponding to the window anomaly type is acquired. Rotation feedback control is performed on the servo motor of the rotating platform according to a sequence position of the anomaly encoding sequence number in the encoded data set so that an anomaly window corresponding to the anomaly encoding sequence number faces the camera. The rotation feedback control controls rotation operation of the servo motor according to a photographing time interval between the anomaly encoding sequence number and a current encoding sequence number. Then, window images of a plurality of anomaly windows corresponding to the anomaly encoding sequence number are photographed for a second time by the camera to obtain a plurality of actual window anomaly images.

In an embodiment, after all the window anomaly types are identified, the servo motor in the rotating platform is controlled to be turned off, and then according to the position of the anomaly encoding sequence number corresponding to the window anomaly type in the whole encoded data set and the position of the camera, the anomaly window corresponding to each anomaly encoding sequence number is rotated to the direct front of the camera, so that the anomaly window corresponding to the anomaly encoding sequence number faces the camera. The rotation time of the servo motor is determined by the anomaly encoding sequence number, the encoding sequence number currently in front of the current camera and the photographing time interval of the camera, and then in combination with the fixed angular rate of the rotating platform, each anomaly window of the bearing holder on the rotating platform can be photographed for the second time by the camera, which helps the operator to observe the actual condition of the windows of the bearing holder in a rear-end system.

Further, all actual window anomaly images and a plurality of corresponding anomaly encoding sequence numbers are acquired, and then single-line laser irradiation is performed with laser rays on a plurality of anomaly windows corresponding to the actual window anomaly images to obtain a plurality of laser rays.

Further, ray tilt angle positioning is performed on the plurality of laser rays based on a pre-set two-dimensional coordinate system on the rotating platform to obtain a plurality of ray tilt angles. Anomaly window position information of a plurality of anomaly windows are determined according to the plurality of ray tilt angles and the plurality of anomaly encoding sequence numbers.

Figure 3:
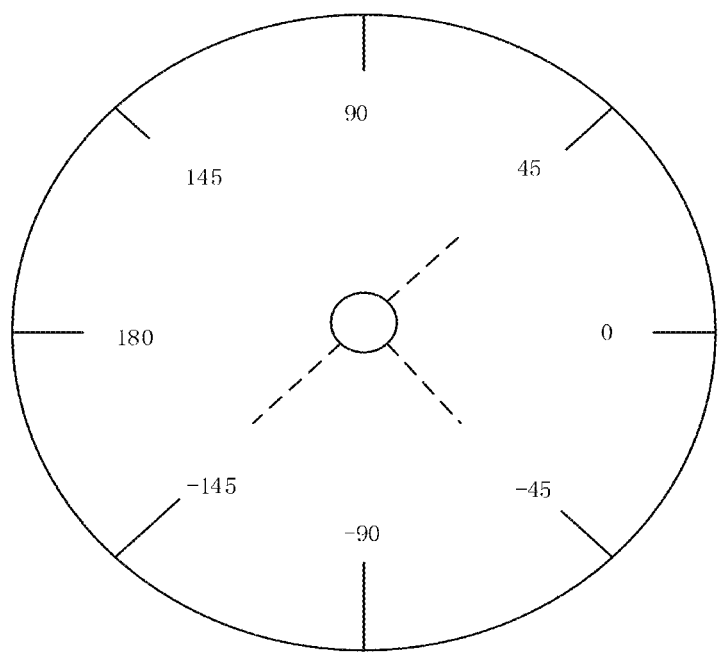
FIG. 3 is a diagram showing plane scales of a two-dimensional coordinate system of a rotating platform according to an embodiment of the present application.

In an embodiment, FIG. 3 is a diagram showing plane scales of a two-dimensional coordinate system of a rotating platform provided by an embodiment of the present application. As shown in FIGS. 3 and 2, with the two-dimensional coordinate system on the rotating platform and laser rays emitted by a laser emitter, the anomaly window is accurately located, and the ray tilt angle formed by the laser rays at this time is obtained, and then anomaly window position information of ray tilt angle-anomaly encoding sequence number is obtained according to the corresponding anomaly encoding sequence number.

S106: A window inspection result of the bearing holder is determined according to the window anomaly type and the actual window anomaly image based on the anomaly window position information, and the window inspection result is sent to a terminal of the operator.

In particular, a plurality of anomaly window position information of ray tilt angle-anomaly encoding sequence number and a plurality of window anomaly types are combined with the actual window anomaly images obtained by photographing for the second time after the feedback control of the rotating platform, and sent to a terminal of the window inspecting system together, wherein the content of the window inspection result is data content in the form of a table, and a table header includes the anomaly window position information, the window anomaly type and the actual window anomaly image, and then data is listed one by one according to the anomaly encoding sequence number, and the window inspection result of the bearing holder is finally formed. The window inspection result data in the form of a table is presented to the operator to help them to manually re-exam and review according to the automatic window inspection result of the bearing holder, further ensuring the pass rate of the finished product of the bearing holder, reducing human errors, and improving the efficiency of window inspection of the bearing holder.

In addition, an embodiment of the present application further provides a window inspecting device for a bearing holder, and as shown in FIG. 6, the window inspection device 600 for the bearing holder specifically includes:

at least one processor 601; and a memory 602 in communication connection to the at least one processor 601. The memory 602 stores instructions executable by the at least one processor 601 to enable the at least one processor 601 to:

photograph continuous window images of the bearing holder on a rotating platform via a camera to obtain an initial window image set;

compare and match each window image in the initial window image set with each other; and select, according to comparing and matching results, a plurality of anomaly-matched window images from the comparing and matching result to obtain a plurality of anomaly window images;

identify and label an anomaly region image in the anomaly window image to obtain an anomaly-labeled region in the anomaly window image;

perform window anomaly classification on the anomaly-labeled region to obtain a window anomaly type of the bearing holder; wherein the window anomaly type includes at least any one or more of: a window size anomaly, a window lintel slope anomaly, a hole patency anomaly and groove depth anomaly;

photograph for a second time window images of an anomaly window corresponding to the window anomaly type via the rotating platform and the camera to obtain an actual window anomaly image; and perform two-dimensional coordinate system related ray localization with laser rays to locate a window position corresponding to the actual window anomaly image to obtain anomaly window position information; and determine a window inspection result of the bearing holder according to the window anomaly type and the actual window anomaly image based on the anomaly window position information, and send the window inspection result to a terminal of an operator.

In the present application, the bearing holder is subjected to window inspection via the rotating platform and the camera, all the identified windows are compared with each other, and then an anomaly window is selected and a window anomaly type is determined; after that, the position of the anomaly window and the anomaly type can be accurately identified, and are combined with the actual window anomaly images and sent to the operator at the rear end. In this way, the workload of the operator for window inspection is greatly reduced while the accuracy is also high; and in combination with laser positioning, the method can help the operator to quickly find the windows with anomalies and determine the corresponding anomaly fault types. Therefore, the labor cost and improving the inspection efficiency are greatly reduced, and a detailed inspection can be carried out on the windows in all aspects, reducing the human errors and improving the pass rate of the finished products of bearing holders.

The various embodiments of the present application are described in a progressive manner, the same and similar parts of the various embodiments may be referenced, and each of the embodiments focuses on the differences from the other embodiments. Device and non-volatile computer storage media embodiments are described with respect to simplicity because they are substantially similar to method embodiments, as described with respect to method embodiments.

Embodiments of the present application have been described above. Other embodiments are within the scope of the following claims. In some cases, the acts or steps recited in the claims may be performed in an order other than that of the embodiments and still achieve the desired results. Additionally, the processes depicted in the FIGS. do not necessarily require a particular order or sequential order shown to achieve desired results. Multi-tasking and parallel processing are also possible or may be advantageous in some embodiments.

The foregoing is by way of example only and is not intended as limiting. Various modifications and changes to the embodiments of the present application will be apparent to a person skilled in the art. Any modifications, equivalents, improvements, etc. that come within the spirit and scope of the embodiments of the invention are intended to be included within the scope of the claims.

What is claimed is:

1. A window inspecting method for a bearing holder, comprising:

photographing continuous window images of the bearing holder on a rotating platform via a camera to obtain an initial window image set;

comparing and matching each window image in the initial window image set with each other; and selecting, according to comparing and matching results, a plurality of anomaly-matched window images from the comparing and matching results to obtain a plurality of anomaly window images, specifically comprising if the comparing and matching result is an anomaly match, acquiring a plurality of sets of gray-scale anomaly-matched window images;

identifying and labeling an anomaly region image in the anomaly window image to obtain an anomaly-labeled region in the anomaly window image, specifically comprising;

performing image sequence encoding processing on all the window images in the initial window image set to obtain an encoded data sets;

performing anomaly labeling on encoding sequence numbers corresponding to the anomaly window images in the encoded data set according to corresponding positions of the plurality of anomaly window images in the initial window image set to obtain anomaly encoding sequence numbers;

performing image region division on an anomaly window image corresponding to the anomaly encoding sequence number according to a gray-scale pixel region corresponding to an anomaly pixel feature to obtain an original anomaly region image, and performing gray-scale processing on the original anomaly region image; wherein the anomaly pixel feature is a pixel feature corresponding to an anomaly window image in each set of gray-scale window images; and each gray-scale window image is divided into 9 gray-scale pixel regions;

performing primary edge image feature constraint processing on the original anomaly region image through second-order differential calculation after the gray-scale processing to obtain a candidate anomaly region;

calculating a minimum pixel distance between a centroid of the candidate anomaly region and an edge image feature region to obtain a distance constraint condition; wherein the edge image feature region is an edge pixel region of the candidate anomaly region;

constructing an edge slope coordinate system based on the candidate anomaly region according to an image corner point in the candidate anomaly region and the centroid;

performing direction positioning of a slope angle on image slope pixels in the candidate anomaly region according to the edge slope coordinate system to obtain a direction constraint condition;

performing secondary edge image feature constraint processing on the candidate anomaly region according to the distance constraint condition and the direction constraint condition to obtain the anomaly-labeled region;

performing window anomaly classification on the anomaly-labeled region to obtain a window anomaly type of the bearing holder; wherein the window anomaly type comprises at least any one or more of: a window size anomaly, a window lintel slope anomaly, a hole patency anomaly, and a groove depth anomaly;

photographing for a second time window images of an anomaly window corresponding to the window anomaly type via the rotating platform and the camera to obtain an actual window anomaly image; and performing two-dimensional coordinate system related ray localization with laser rays to locate a window position corresponding to the actual window anomaly image, to obtain anomaly window position information; and determining a window inspection result of the bearing holder according to the window anomaly type and the actual window anomaly image based on the anomaly window position information, and sending the window inspection result to a terminal of an operator.

2. The window inspecting method for a bearing holder according to claim 1, wherein the photographing continuous window images of the bearing holder on a rotating platform via a camera to obtain an initial window image set, specifically comprises:

acquiring drawing information of the bearing holder to be produced, wherein the drawing information at least comprises: a window count, a window size, a bearing holder radius, and window lintel processing parameters;

inputting the window count and the bearing holder radius in the drawing information to a control unit of a rotating platform control system; wherein the rotating platform control system comprises the control unit, a servo motor unit and a laser emitting unit;

determining an angular rate of the rotating platform according to the window count and based on a photographing time interval of the camera to photograph each window of the bearing holder;

controlling operation of the rotating platform according to the angular rate of the rotating platform, and photographing continuous window images of the bearing holder based on the camera to obtain a partial window image set; wherein the partial window image set is an image set photographed at a plurality of first time intervals from the beginning of the camera;

performing area detection on a window lintel pixel of a gray-scale image set of the partial window image set according to a pre-set Canny operator to obtain an actual window lintel pixel area; comparing an area value of the actual window lintel pixel area with a standard window lintel pixel area; and determining a successfully-matched actual window lintel pixel area as a complete window lintel pixel value; and determining a window image corresponding to the complete window lintel pixel value as a first window image; and re-feeding back the window image to the control unit of the rotating platform control system according to the first window image and a corresponding photographing time interval of the camera, so that each window of the bearing holder is completely photographed to obtain the initial window image set.

3. The window inspecting method for a bearing holder according to claim 1, wherein the comparing and matching each window image in the initial window image set with each other, specifically comprises:

performing gray-scale pre-processing on each window image to obtain a plurality of gray-scale window images;

performing region division on the gray-scale window image based on a pre-set division line to according to an actual pixel size of the gray-scale window image obtain a gray-scale pixel region; wherein each gray-scale window image is divided into 9 gray-scale pixel regions;

traversing pixel features in each of the gray-scale pixel regions; wherein the pixel feature comprises a bright-dark gradient feature of each pixel point and a corresponding pixel coordinate position feature; and performing similarity comparison and matching between various gray-scale window images on a plurality of pixel features in one-to-one correspondence to the gray-scale pixel regions of the plurality of gray-scale window images according to the pixel features in each of the gray-scale pixel regions to obtain a comparing and matching result; wherein the comparing and matching result comprises: a normal match and an anomaly match; the similarity comparison and matching is a similarity matching of corresponding pixel features between any two sets of gray-scale window images.

4. The window inspecting method for a bearing holder according to claim 1, wherein the selecting, according to comparing and matching results, a plurality of anomaly-matched window images from the comparing and matching results to obtain a plurality of anomaly window images, specifically comprises:

extracting distinguishing pixel features and corresponding distinguishing gray-scale pixel regions in the plurality of sets of gray-scale window images; and acquiring normal gray-scale pixel regions according to a plurality of normal window images of which the comparing and matching results are normal matches;

performing similarity learning training on cross pixel features of the distinguishing gray-scale pixel regions and the normal gray-scale pixel regions according to a convolution neural network and a Sigmoid function to obtain a cross-classification network model; wherein the cross-classification network model has a basic architecture of twin neural network;

cross-classifying the plurality of sets of gray-scale window images via the cross-classification network model based on different allocation weights of the distinguishing gray-scale pixel regions and the normal gray-scale pixel regions to eliminate normal pixel features in the distinguishing pixel features and obtain anomaly pixel features in the distinguishing pixel features; wherein the anomaly pixel feature is a pixel feature corresponding to an anomaly window image in each set of gray-scale window images; and selecting a plurality of gray-scale pixel regions corresponding to the anomaly pixel features to obtain the plurality of anomaly window images corresponding to the anomaly pixel features.

5. The window inspecting method for a bearing holder according to claim 1, wherein the performing window anomaly classification on the anomaly-labeled region to obtain a window anomaly type of the bearing holder, specifically comprises:

performing window anomaly classification matching on the anomaly-labeled region via a window anomaly template in a historical window anomaly database; and if the matching is successful, determining a window anomaly type corresponding to the window anomaly template as a window anomaly type of the anomaly-labeled region;

if the matching is unsuccessful, determining a window anomaly type of the anomaly-labeled region;

performing linear detection on pixel point sets on cross-beam pixels and longitudinal-beam pixels of a window in the anomaly-labeled region via a Hough transform linear detection algorithm to obtain window size information;

performing linear slope calculation on pixel sets of a same brightness gradient in the anomaly-labeled region according to a Hough transform to obtain window lintel slope information;

identifying disjoint curves in the anomaly-labeled region via a Hough transform circle detection algorithm to obtain a circular contour region; and calculating areas of same pixels in the circular contour region to obtain hole-area information according to adjacent connected domains in the anomaly-labeled region;

calculating a pixel length of a concave-convex region in the anomaly-labeled region to obtain groove depth information; and comparing the drawing information with the window size information, the window lintel slope information, the hole-area information, and the groove depth information to determine a window anomaly type of the anomaly-labeled region.

6. The window inspecting method for a bearing holder according to claim 1, wherein the photographing for a second time window images of an anomaly window corresponding to the window anomaly type via the rotating platform and the camera to obtain an actual window anomaly image, specifically comprises:

acquiring an anomaly encoding sequence number of an anomaly window corresponding to the window anomaly type;

performing rotation feedback control on a servo motor of the rotating platform according to a sequence position of the anomaly encoding sequence number in the encoded data set so that an anomaly window corresponding to the anomaly encoding sequence number faces the camera; wherein the rotation feedback control controls rotation operation of the servo motor according to a photographing time interval between the anomaly encoding sequence number and a current encoding sequence number; and photographing for a second time window images of a plurality of anomaly windows corresponding to the anomaly encoding sequence number by the camera to obtain a plurality of actual window anomaly images.

7. The window inspecting method for a bearing holder according to claim 1, wherein the performing two-dimensional coordinate system related ray localization with laser rays to locate a window position corresponding to the actual window anomaly image, to obtain anomaly window position information, specifically comprises:

acquiring all actual window anomaly images and a plurality of corresponding anomaly encoding sequence numbers, and then performing single-line laser irradiation with laser rays on a plurality of anomaly windows corresponding to the actual window anomaly images to obtain a plurality of laser rays; and performing ray tilt angle positioning on the plurality of laser rays based on a pre-set two-dimensional coordinate system on the rotating platform to obtain a plurality of ray tilt angles; and determining anomaly window position information of a plurality of anomaly windows according to the plurality of ray tilt angles and the plurality of anomaly encoding sequence numbers.

* * * * *